E. SOLVAY.
Process and Apparatus for the Manufacture of Carbonate of Soda.
No. 136,463.  Patented March 4, 1873.
2 Sheets--Sheet 1.
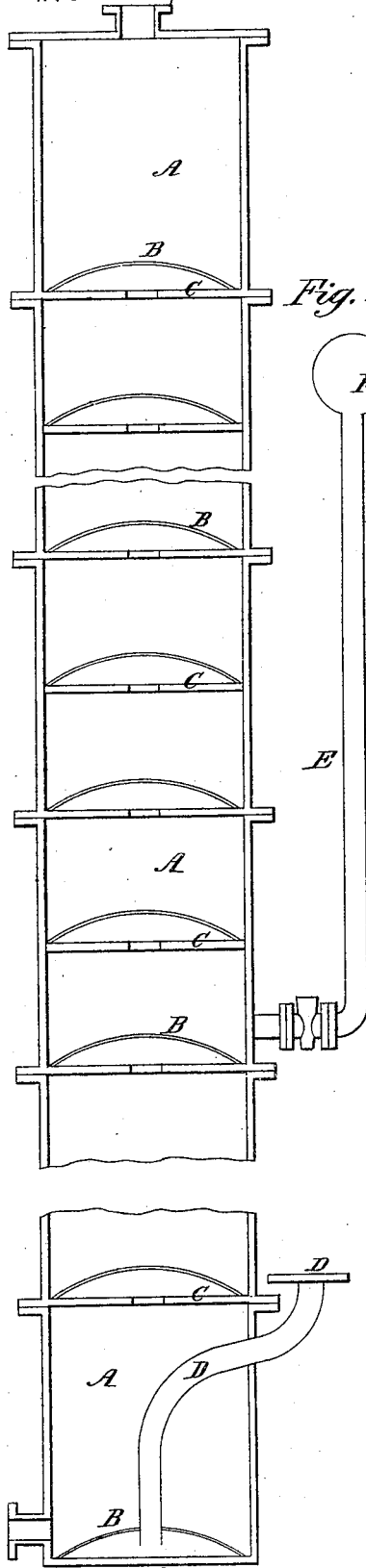
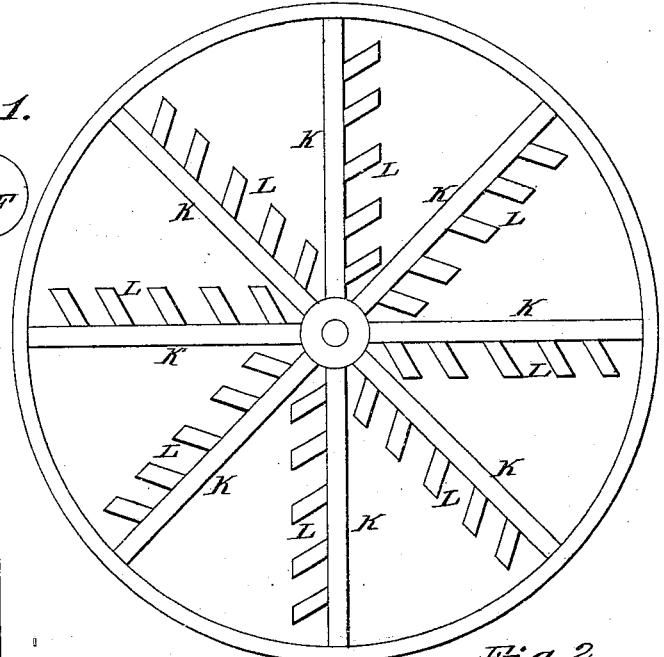
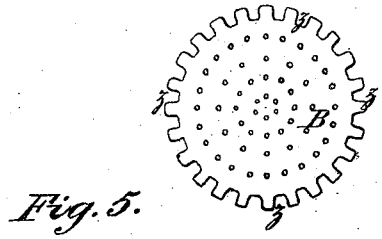
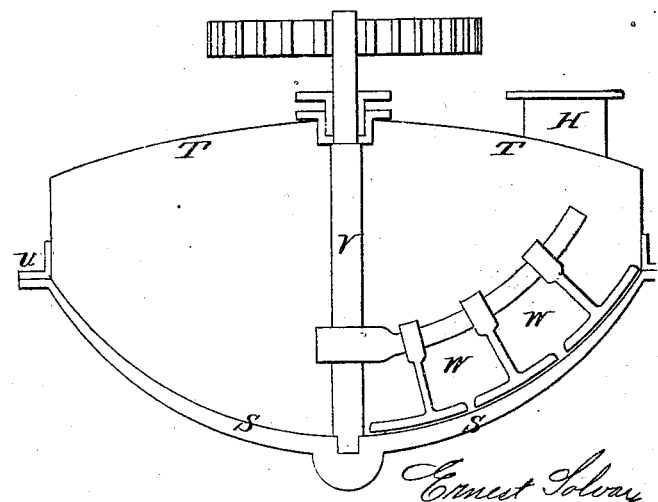
Witnesses.
R. H. Whittlesey
W. F. Hutchinson
Ernest Solvay
Inventor:

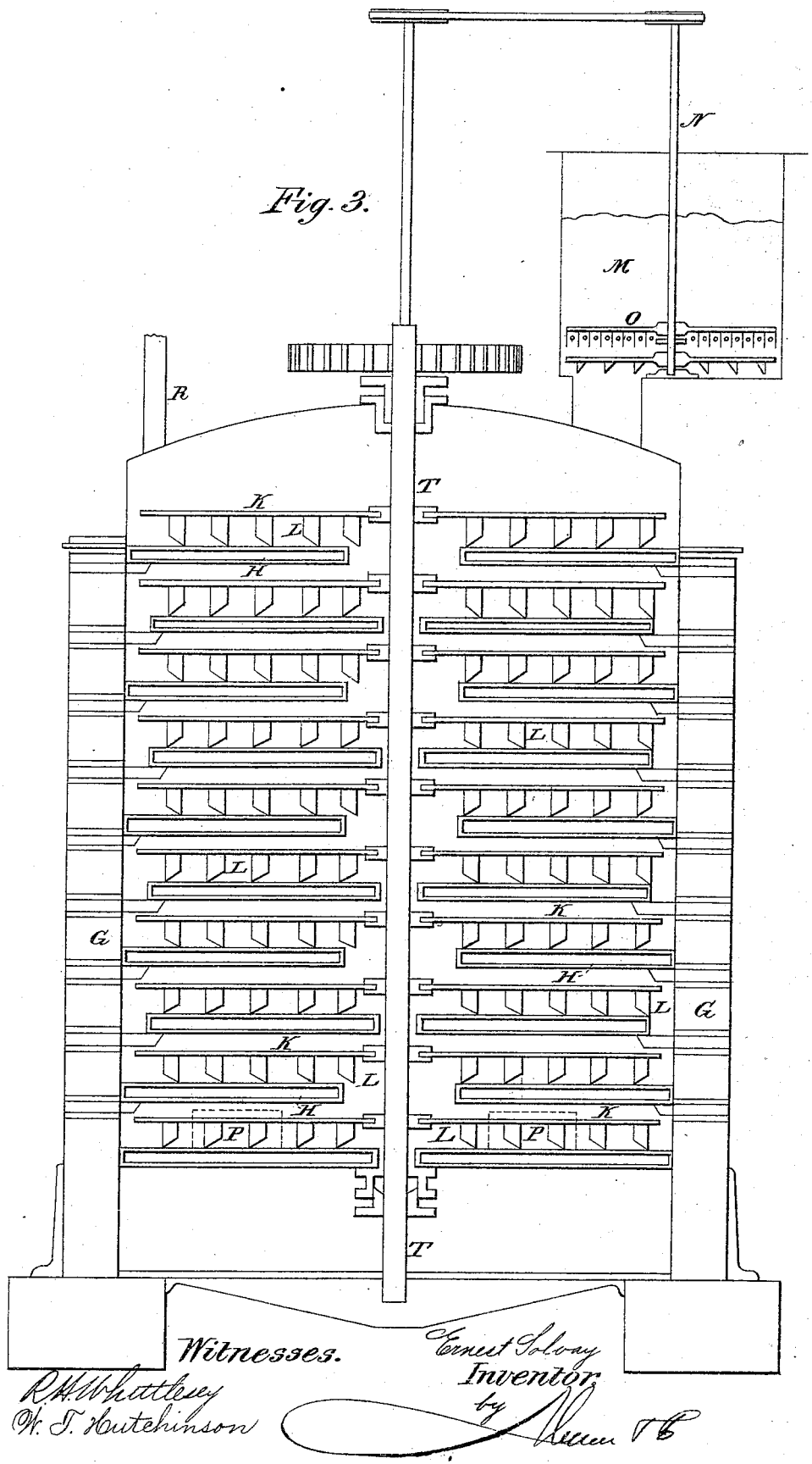

UNITED STATES PATENT OFFICE.

ERNEST SOLVAY, OF BRUSSELS, BELGIUM.

IMPROVEMENT IN PROCESSES AND APPARATUS FOR THE MANUFACTURE OF CARBONATE OF SODA.

Specification forming part of Letters Patent No. 136,463, dated March 4, 1873.

*To all whom it may concern:*

Be it known that I, ERNEST SOLVAY, of Brussels, in the Kingdom of Belgium, have invented certain improvements in the manufacture or production of carbonate and bicarbonate of soda and accessory products thereof, and also in apparatus used in such manufacture, of which the following is a specification:

The manufacture of carbonate and bicarbonate of soda has hitherto been carried out by causing carbonic-acid gas to act upon a solution of salt and ammonia in a series of horizontal cylinders, the gas and the solution passing in opposite directions; or by an apparatus for which I obtained Letters Patent in 1863, No. 3,131, which consists of three compartments superposed one above the other, each of which is provided with horizontal shelves and with false perforated bottoms, the gas in this case entering under a slight pressure, and passes upward through this apparatus, and is repeatedly divided by its passage through the perforated bottoms, while the solution enters the middle compartment first, then passes through a pipe to the top compartment, and ultimately through another pipe to the bottom compartment, being compelled to make a long and circuitous route by the horizontal shelves in the different compartments.

In all these apparatuses the liquor was made to move mainly in a horizontal direction, and was exposed to the gas in a comparatively shallow layer, the height of which was never exceeding but generally very much below its length or width. Having found this mode of treatment slow and inconvenient, I now force the carbonic-acid gas through a column of liquor of considerable height, always exceeding and generally many times as large as its greatest width; and I make the liquor pass downward mainly in a vertical direction, while the gas passes upward through the liquor. In place of the apparatus divided into three compartments, I now employ a single vessel, by preference of a cylindrical shape.

In the drawing, Figure 1 is a vertical section; Fig. 2, plan view; Fig. 3, section; Fig. 4, plan; Fig. 5, section of arrangements and parts, hereafter described.

A, Fig. 1, represents a cylindrical vessel of considerable height in proportion to its width, which vessel I hereafter call an absorber. Into this absorber I place a number of plates, B, Figs. 1 and 2, perforated with small holes, so as to divide the gas as much and as often as practicable, and also a number of plates, C, provided with one or a few large holes, which will just allow the liquor and gas to pass without permitting the fresh liquor entering the absorber to mix with the nearly saturated liquor at the bottom of the absorber. The perforated plates I prefer to make of the shape of calotte or globular segment B, Figs. 1 and 2, and to provide them with projections or teeth $z$ (some only marked in the drawing) round their circumferences, the openings between the said teeth allowing the liquor and gas to pass, when the small holes may be partially stopped up. The above-mentioned plates may be cast as part of the apparatus, or be separate pieces, or be supported therein by any convenient means. This absorber is always kept nearly full of liquor, while the carbonic acid obtained from any convenient source, but by preference from a limekiln, is forced—say by means of an air-pump—in at the bottom of the absorber, through a pipe, D. The carbonic acid should enter under a pressure exceeding the pressure of the column of liquor which the gas has to pass through. By these means the gas is brought into very intimate contact with a high column of liquor moving in an opposite direction, and is at the same time made to expand and to do a considerable amount of mechanical work, in consequence whereof it absorbs an amount of heat sufficient to prevent all heating of the liquor in the apparatus, otherwise produced by the absorption of the carbonic acid, and which I have found very difficult to prevent by any other means. The liquor is made to enter the said absorber at about half its height through a pipe, E, and is supplied by a tank, F, in which it is always kept at the same level, equal to about ten feet under the top of the said absorber. This tank is closed and connected with the top of the said absorber by a pipe, (not shown in the drawing,) in order to equalize the pressure in both. The same tank will supply any number of absorbers with liquor. The liquor in the upper half of the said absorber is thus only renewed, and descends only very slowly, and, being very soon saturated with carbonic acid, it is in the proper condition to retain nearly all the ammonia which the gas carries away from the liquor in the lower half of the said absorber. The ammonia is thus nearly all retained in the said absorber itself. These absorbers must be of sufficient height to cause at least the absorption of about one-half of the carbonic acid contained in the gas entering the said absorbers, while at the same time all the ammonia in the liquor must be converted into bicarbonate before leaving the absorbers. I find that the height of thirty-five to fifty feet gives the best results in practical working, which requires the gas to be forced into the said absorbers with a pressure of from one and a half to two atmospheres. I prefer to force the gas into the absorbers in a manner not altogether continuous, as I thereby obtain a better agitation inside the absorbers, which prevents the deposit of bicarbonate of soda in any part of the apparatus, and facilitates its descending with the liquor. From time to time, however, the small holes in the perforated plates are partially closed by a hard crust which forms inside the absorber. The absorber is then emptied, subsequently filled with water, and steam passed into it until the whole of the crust is dissolved. The solution is run off and is utilized by known means, and the absorber after cooling is filled again with the liquor from another absorber, and is set to work again as before. The liquor after being saturated in the absorber is run out at the bottom through pipes and taps. It may be run out continuously, but I find it preferable to draw off a quantity from time to time—say every thirty minutes. This liquor contains a quantity of bicarbonate of soda in suspension, which may be separated by known means; but I prefer to use for this purpose a vacuum-filter. The false bottom of this filter I cover with strong cloth or any other suitable material, and I produce the vacuum underneath it, by preference, by the same pump which lifts the filtered liquor. The vacuum-filter permits the bicarbonate to be perfectly washed with a very small quantity of water, and also permits it to be obtained at once in a comparatively dry state. In order to be fitted for the market it may be dried in the same filter by drawing through it for some time air or any other gas or vapor, which may be heated up to about 120° Fahrenheit; or the bicarbonate may be taken out of the filter and dried in any other convenient apparatus. If the bicarbonate is to be converted into mono-carbonate it may be treated in the vacuum-filter by drawing through it hot air, or superheated steam, or the hot gases from the limekilns, or any other source; but I prefer for the drying of the bicarbonate, as well as for its conversion into mono-carbonate, an apparatus of the following description:

This apparatus, Figs. 3 and 4, consists of a vertical cylinder, G, in which are placed a number of circular shelves, H, (some only being marked,) at a convenient distance one above another. A vertical shaft, I, driven by any convenient means, passes from top to bottom of the cylinder. This shaft carries arms K, which are provided with scrapers L, (some only marked,) and these latter are so arranged that they cause the substance on the shelves to move alternately to the circumference of one shelf and to the center of the next one, and so on. The shelves themselves are double or hollow, so that steam, with or without pressure, or superheated or hot air, or the gases from the limekiln or any other source, can be introduced, and they are provided, alternately, with suitable openings on the circumference or in the center, which allow the substance moved by the scrapers to fall from every shelf onto the next one beneath it until it arrives at the bottom of the cylinder. The bicarbonate is fed in on the top of the cylinder from a hopper, M, by means of a shaft, N, provided with arms O, which move slowly. The hopper is always kept full of bicarbonate, which prevents the escape of any gas through it. The dried substance leaves the bottom of the cylinder (by the doors P) in a finely-divided state and ready for packing. By properly regulating the temperature inside the cylinder one obtains either bicarbonate or mono-carbonate of soda, or any desired mixture thereof. The gases given off from the drying substance pass through a pipe, R, in the top of the cylinder. The drying can also be effected in this apparatus by passing a current of air or of superheated steam, or the gas obtained from the lime-kilns, or any other furnace or any other source, through the cylinder, in which case it is not necessary to use hollow shelves, though these will be found to facilitate the drying under all circumstances. Another drying apparatus which I have found useful when mono-carbonate of soda is required consists in a cast-iron pot or pan, S, shown in Fig. 5, which is tightly covered in by a cast or wrought iron hood, T, provided with a door, U, through which the bicarbonate is charged into and the finished product drawn out of the pot. A vertical shaft, V, driven by any convenient power, passes through a stuffing-box in the center of the hood, and carries at its lower end arms with scrapers W, which continually turn over the material to be dried. The pot is heated by a fire underneath to the required temperature, and the gases evolved from the drying bicarbonate pass away through an opening, X, in the hood. The gases given off in this or the other drying apparatus are passed by means of an air-pump through any convenient cooling and absorbing apparatus, containing brine-water, chloride of calcium, an acid, or other efficient absorbent, in order to retain all the ammonia the gases contain. When mono-carbonate of soda has been made these gases also contain carbonic acid, which is forced through the absorbers previously described, along with the gases obtained from the limekilns or other source. The gases which leave the absorbers, and the gases or air drawn through the bicarbonate in the vacuum-filters, and all or any gases charged with ammonia which are obtained during any stage of the process, before being allowed to escape into the air, are passed through one or several convenient washing-vessels, by preference of a construction similar to the absorbers, and which are filled with water-brine, chloride of calcium, an acid, or any other efficient absorbent. In regenerating the ammonia from the liquor separated from the bicarbonate of soda, I usually employ the ordinary well-known methods; but in places where muriatic acid is of value, I evolve the ammonia from these liquors by means of magnesia or a basic chloride of magnesium. The solution of chloride of magnesium and chloride of sodium thus obtained I boil down, and heat the residue in the presence of steam until no more muriatic acid is given off; and I condense this muriatic acid or otherwise utilize it—for instance, in the direct production of chlorine by any known means. The solid residue which remains consists mainly of magnesia and chloride of sodium. After having dissolved the chloride of sodium by water or weak brine, I employ the remaining magnesia or basic chloride of magnesium to decompose a new quantity of the above-mentioned liquor. By this means the same magnesia is used over and over again to regenerate any quantity of ammonia, while at the same time all the chloride of sodium which has not been transformed into bicarbonate of soda is recovered.

Having thus described my invention, what I claim as new, and desire to secure by Letters Patent, is—

1. Forcing carbonic-acid gas obtained from any convenient source through a high column of a solution of salt and ammonia, the height of which always exceeds and is generally several times as large as its greatest width, and so make the liquor descend and the gas ascend mainly in a vertical direction, by which means a very active reaction is obtained, and a complete prevention of the heating of the liquid.

2. The use of a single vessel of considerable height in proportion to its width, hereinbefore called "absorber," for treating the solution of salt and ammonia by carbonic acid.

3. The use of plates perforated with small holes and provided with teeth round their circumference in the said absorber, in order to divide the gas as often as practicable.

4. The peculiar form of calotte or globular segment given to these plates.

5. The use of plates provided with one or a few large holes in the said absorber to prevent the mixing of the liquor at the bottom and top of the said absorber.

6. Feeding the liquor into the absorber at about half of its height, for obtaining the liquor in the upper half of the absorber in a fit state to retain the ammonia carried off by the gas from the lower half of the absorber.

7. The use of a vacuum-filter for separating the bicarbonate from the liquid.

8. The drying of the bicarbonate and its conversion into mono-carbonate of soda with the same filter by passing a current of air or other gas through it.

9. The drying apparatus, consisting of a cylinder in which are placed circular shelves with proper openings, and which is provided with shaft-arms and scrapers, which cause the drying substance to move from the top to the bottom of the cylinder, for the purposes hereinbefore set forth.

10. The use of hollow shelves heated internally in the said drying apparatus.

11. The drying apparatus, consisting of a hood provided with a central shaft, arms, and scrapers, for the purposes hereinbefore set forth.

12. The regeneration of the ammonia from the liquid from which the bicarbonate has been separated by magnesia or a basic chloride of magnesium, and the subsequent treatment of the liquid thus obtained, by which muriatic acid or chlorine is obtained, and the magnesia, as well as all the salt which has not been converted into bicarbonate, are recovered.

The above specification signed by me this 15th day of May, 1872.

E. SOLVAY.

Witnesses:
THOMAS MORGAN,
21 Cockspur street, London.
R. MARSDEN LATHAM,
21 Cockspur street, Charing Cross, London.